United States Patent [19]

Chen

[11] Patent Number: 5,044,403
[45] Date of Patent: Sep. 3, 1991

[54] DIRT AND MOISTURE SEALING PIPE PLUG FOR SEALING DIFFERENT SIZE PIPE

[76] Inventor: Chung F. Chen, 26272 Tarssa La., Mission Viejo, Calif. 92691

[21] Appl. No.: 592,386

[22] Filed: Oct. 3, 1990

[51] Int. Cl.$^5$ ............................................. F16L 11/12
[52] U.S. Cl. ...................................... 138/89; 220/235; 220/236; 220/237
[58] Field of Search ................ 138/89, 96 R, 96 T, 138/178; 220/233, 234, 235, 236, 237

[56] References Cited

U.S. PATENT DOCUMENTS

| | | | |
|---|---|---|---|
| 2,375,995 | 5/1945 | Kaeser | 138/89 |
| 3,494,504 | 2/1970 | Jackson | 138/89 |
| 3,747,541 | 7/1973 | Reese | 138/89 |
| 4,493,344 | 1/1985 | Mathison et al. | 138/89 |
| 4,585,033 | 4/1986 | Westman | 138/89 |
| 4,762,151 | 8/1988 | Kinnan | 138/89 |

FOREIGN PATENT DOCUMENTS

| | | | |
|---|---|---|---|
| 606503 | 11/1934 | Fed. Rep. of Germany | 138/89 |
| 2147079 | 5/1985 | United Kingdom | 138/89 |
| 2161993 | 1/1986 | United Kingdom | 138/89 |

Primary Examiner—James E. Bryant, III
Attorney, Agent, or Firm—Lowe, Price, LeBlanc & Becker

[57] ABSTRACT

A pipe plug of the type including a tie plate having a threaded bolt extending upward from a stepped circular base for mounted an elastic seal ring, a wedge ring and a cone permitting the cone to rotate on the threaded bolt to force the wedge ring to squeeze the seal ring to extend outward for sealing a tubing. The upper step of the stepped circular base of the tie plate is inserted in the seal ring when the seal ring is mounted on the lower step of the stepped circular base so that the seal ring can only be stretched outward.

1 Claim, 4 Drawing Sheets

DIRT AND MOISTURE SEALING PIPE PLUG FOR SEALING DIFFERENT SIZE PIPE

BACKGROUND OF THE INVENTION

The present invention relates to pipe plugs, and more particularly relates to a structure of pipe plug convenient for sealing the orifice of different pipe gauge tubing without the use of any tools.

The tubing which is buried under the ground for holding telecommunication or power cables in place shall be sealed at the orifice to protect against dirt and moisture. A pipe plug is generally used for this purpose. While fastening a pipe plug in the orifice of a tubing a specific tool is generally required. Conventionally, a pipe plug is designed for sealing a specific gauge tubing, i.e., different pipe plugs must be respectiverly used for different gauge tubing. Further, the same gauge tubing may have different boring bore due to different wall thickness. For example, the inner diameter of the so-called 4" PVC pipe may range from 100 m/m to 108 m/m. The difference may be as great as 8%. Therefore, different pipe plugs may be required for sealing the pipes of same gauge.

SUMMARY OF THE INVENTION

The present invention has been accomplished to eliminate the aforesaid problems. It is therefore an object of the present invention to provide a pipe plug which can be used for sealing different gauge tubing of boring bore within 18% in tolerance.

It is still another object of the present invention to provide a pipe plug can be used for sealing different gauge tubing through hand operation without the use of any tools.

To achieve the above objects, there is provide a pipe plug comprising a tie plate having a threaded bolt extending upward from a stepped circular base for mounting an elastic seal ring, a wedge ring and a cone permitting the cone to rotate on the threaded bolt to force the wedge ring to squeeze the seal ring to extend outward for sealing a tubing. The cone is rotated in reverse dirction so that the seal ring is returned to original condition and the pipe plug is allowed to remove form a tubing conveniently. The upper step of the stepped circular base of the tie plate is inserted in the seal ring when the seal ring is mouned on the lower step of the stepped circular base so that the seal ring can only be stretched outward.

BRIEF DESCRIPTION OF THE DRAWINGS

The present invention will now be described by way of example with reference to the annexed drawings, in which.

DETAILED DESCRIPTION OF THE PREFERRED EMBODIMENT

Figure 1:
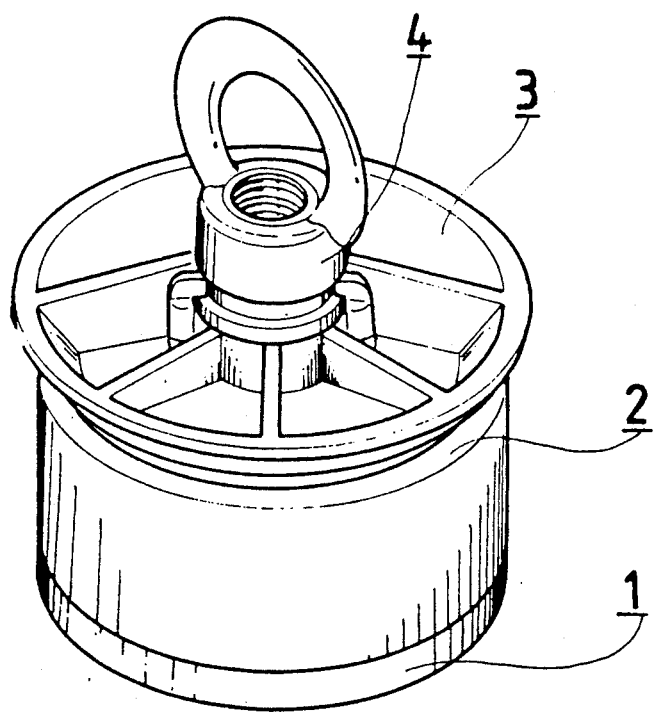
FIG. 1 is a perspective view of the preferred embodiment of the present invention.
Figure 2:
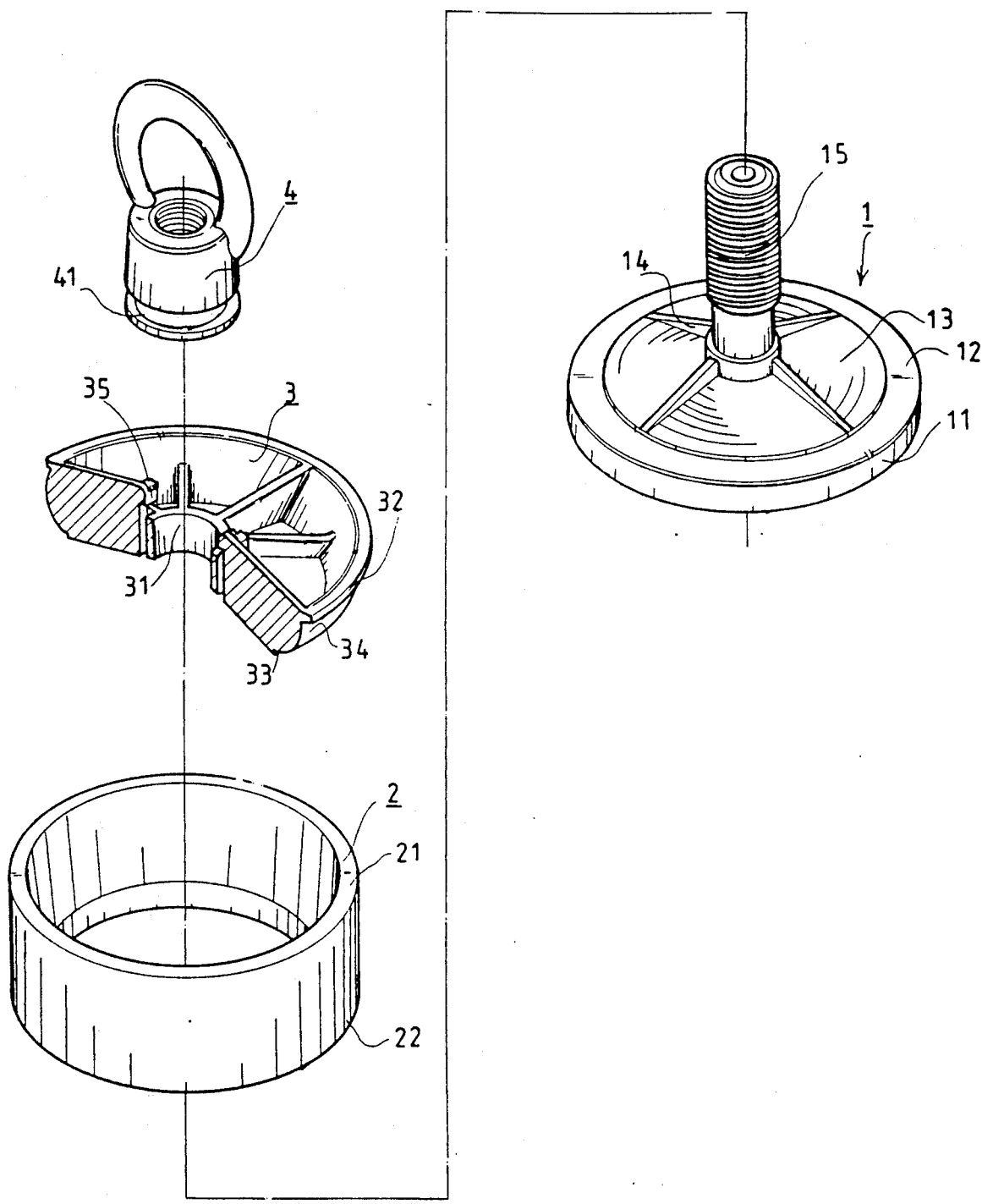
FIG. 2 is a dismantled view of the preferred embodiment of the present invention.

Referring to FIGS. 1 and 2, therein illustrated is a pipe plug embodying the present invention and generally comprised of a tie plate 1, a seal ring 2, a wedge ring 3 and a cone 4. The tie plate 1 is made of rigid material such as copper, aluminum or rigid plastics, having a threaded bolt 15 vertically extending upward from a circular, stepped base 11 at the center, which stepped base 11 has a lower top surface portion 12 and a higher top surface portion 13. A plurality of radial reinforcing ribs 14 are formed on the higher top surface portion 13 to reinforce the structure of the tie plate 1. When in installation, the wedge ring 3 is inserted in the seal ring 2 at the top, the seal ring 2 is mounted on the lower top surface portion 12 of the tie plate 1 permitting the threaded bolt 15 to insert through the seal ring 2 and the center hole 31 of wedge ring 3 for fastening with the cone 1 through screw joint. The cone 4 has threaded boring bore for fastening with the threaded bolt 15 of the tie plate 1, and a loop at the top through which the cone 4 can be conveniently turned to move up and down on the threaded bolt 15. When the cone 4 which is fastened on the threaded bolt 15 of the tie plate 1 is screwed downward, the seal ring 2 is immediately squeezed to extend outward so as to tightly seal the orifice of a tubing. Because of the effect of rhe wedge ring 3, the seal ring 2 can only be squeezed to extend outward but will not be forced to gather inward when the cone 4 is screwed downward on the threaded bolt 15.

Figure 3:
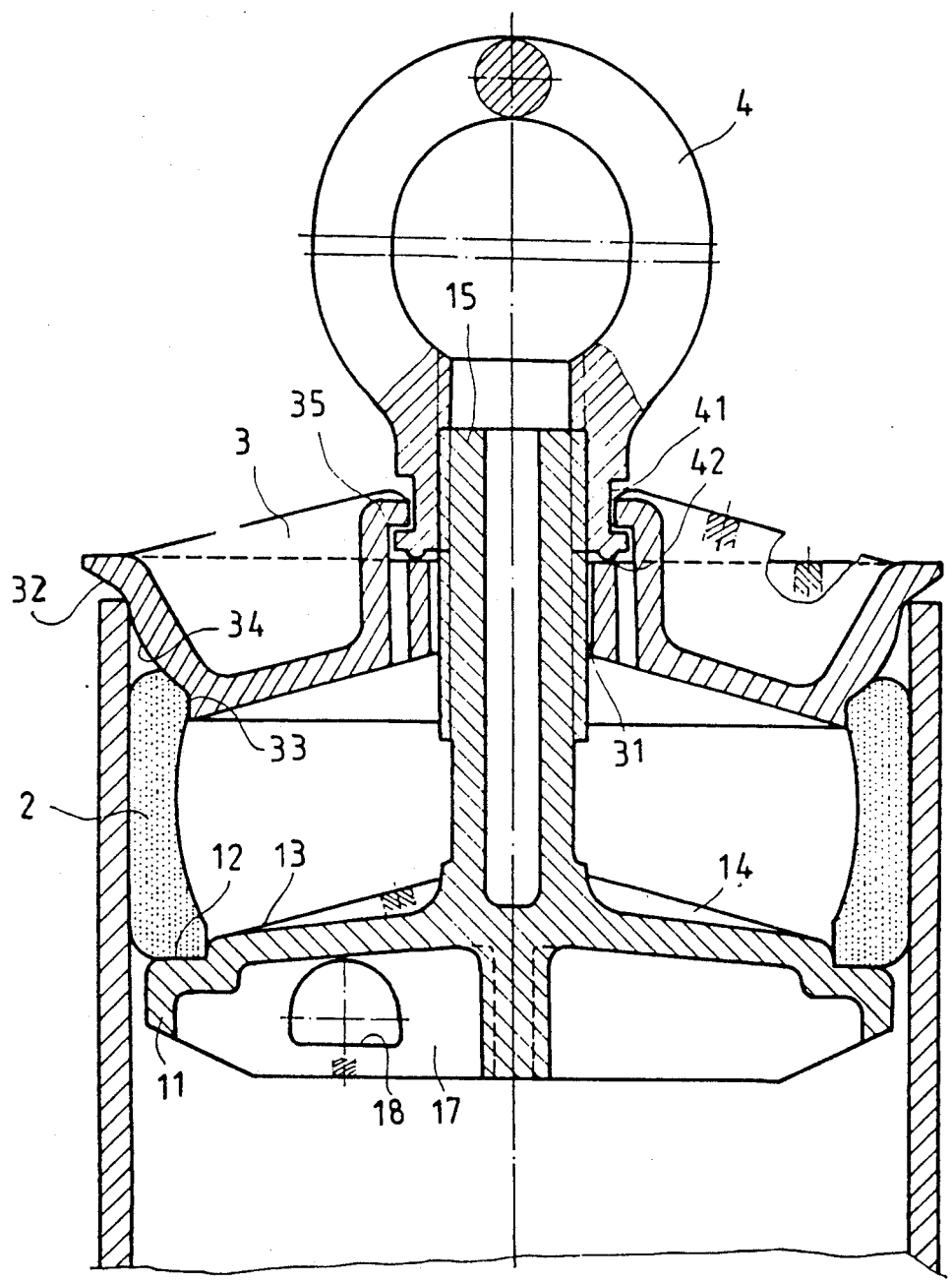
FIG. 3 is a schemctic, longitudinal sectional view, illustrating the use of the present invention in sealing a tubing of relatively smaller boring bore.
Figure 4:
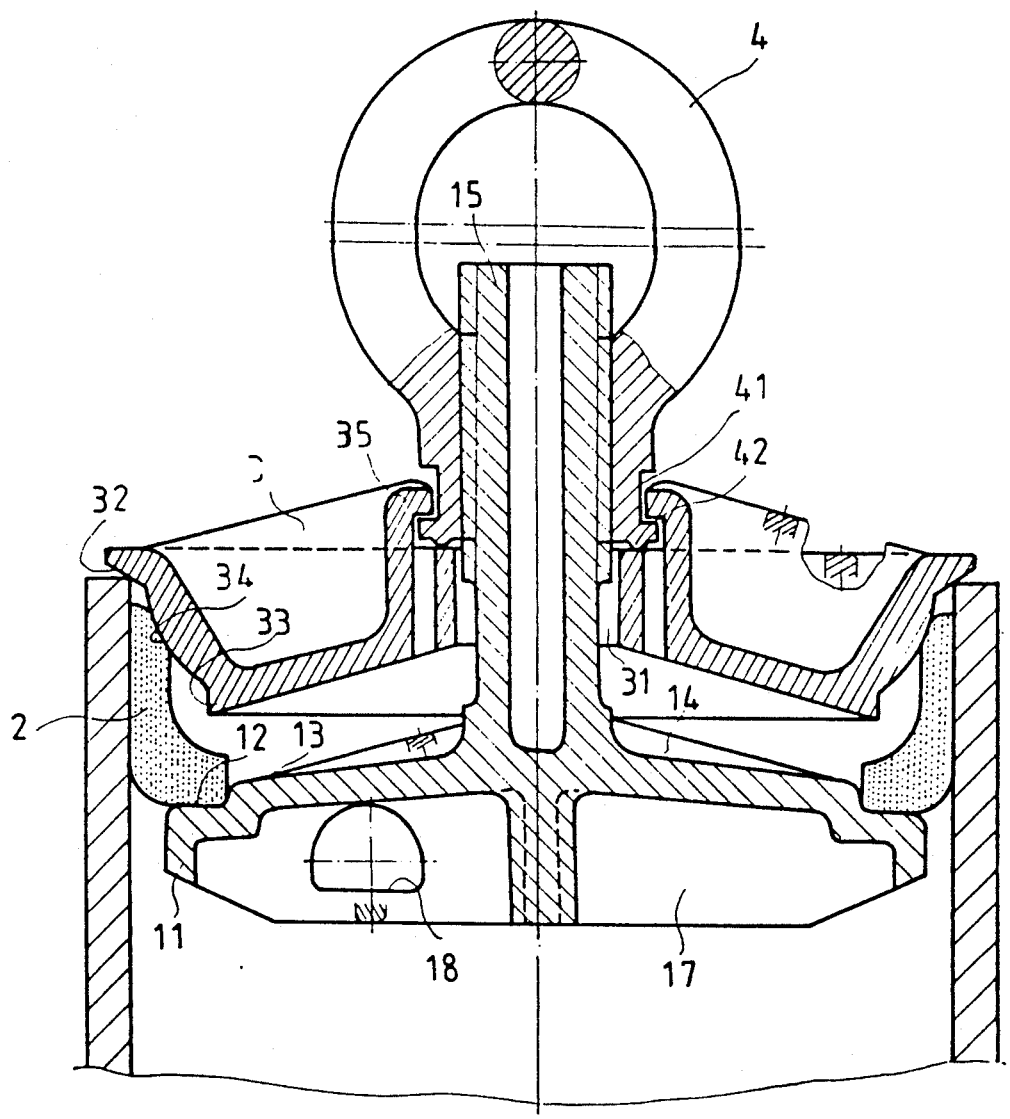
FIG. 4 is a schematic, longitudinal sectional view, illustrating the use of the present invention in sealing a tubing of relatively larger boring bore.

Referring to FIGS. 3 and 4, the tie plate 1 further comprises a plurality of radial reinforcing ribs 17 (in the present preferred embodimemt there are eight radial reinforcing ribs) on its bottom either one of which has a semi-circular hole 18 for fastening a cord for use in holding a cable to be inserted through a tubing to which the pipe plug is fastened. The seal ring 2 is made of rubber, eleatic plastic or other suitable elastic material, having a relatively wider boring bore portion 21 at one end and a relatively narrower boring bore portion 22 at an opposite end (i.e. the wall thickness is greater at the upper end). Therefore, the wedge ring 3 can be conveniently inserted in the wider boring bore portion 21 and squeezed to force the seal ring 2 to extend outward. Because the narrower boring bore portion 22 is mounted on the lower top surface portion 12 of the tie plate 1 with the higher top surface portion 13 inserted therein, the narrower boring bore portion 22 of the rubber ring 2 will not be turned up inward when the seal ring 2 is squeezed between the wedge ring 3 and the tie plate 1. The wedge ring 3 has a wider circular top edge 32 and a narrower circular bottom edge 33 with a tapered side wall 34 defined therebetween, which tapered side wall 34 has a circular arc surface at the outer side. A plurality of hook portions 35 are formed in the wedge ring 3 at the top atound the center hole 31 thereof for engaging within the circular groove 41 at the lower end of the cone 4 during installation, so as to increase the binding strength. The cone 4 has a circular projection 42 at the bottom which reduces the friction against the top edge of the center hole 31 of the wedge ring 3 when the cone 4 is fastened downward on the threaded bolt 15.

The operation of the present invention is quite simple and outlined hereinafter. After the tie plate 1, the seal ring 2, the wedge ring 3 and the cone 4 are assembled into a pipe plug and inserted in the orifice of tubing (see FIGS. 3 and 4 again), the cone 4 is turned with a hand to rotate on the threaded bolt 15 permitting the tie plate 1 to move upward relative to the cove 4. During upward movement of the tie plate 1 the seal ring 2 is simultaneously moved to press against the wedge ring 3. Because of the effect of the tapered side wall 34, the seal ring 2 is gradually squeezed to extend outward against the inner wall surface of the tubing when the tie plate 2 is continuously moved upward relative to the cone 4 after its top edge of the wider boring bore portion 21 is stopped at the circular top edge 32 of the wedge ring 3. Since the tapered side wall 34 has an outer surface in circular arc curvature, it can be force to flexibly squeexe the seal ring 2 to extend outward to the extent according to the inner diameter of the orifice of the tubing top seal.

As described above, the pipe orifice sealing effect of the present invention is achieved by squeezing and simultaneously stretching the ring. Because the wedge ring 3 has a wider circular top edge 32 and a narrower circular bottom edge 33 with a tapered side wall 34 defined therebetween, it can be inserted in the seal ring 2 to a depth according to the boring of the pipe orifice the plug is inserted so as to stretch the seal ring 2 to tigntly seal out dirt and moisture. Further, different gauge of seal ring may be used to match with the tie plate 1, the wedge ring 3 and the cone 4 for sealing different gauge tubing. Because the seal ring 2 is mounted on the lower top surface portion 12 of the tie plate 1 permitting the higher top surface portion 13 of the tie plate 1 to insert in the narrower boring bore portion 22, it is firmly internally supported and can only be squeezed to extend outward for sealing a tubing. When the cone 4 is rotated in reverse direction, squeezing force is released from the seal ring 2 permitting the seal ring 2 to return to original condition, thus the pipe plug can be conveniently removed from a tubing.

What is claimed is:

1. A pipe plug for sealing a tubing against dirt and moisture comprising:
   a tie plate having a threaded bolt vertically extending upward from a circular, stepped base at the center, said stepped base having a lower top surface portion and a higher top surface portion;
   an elastic seal ring having a tapered boring bore and being mounted on said lower top surface portion of said tie plate with its wider boring bore portion disposed at the top and its narrower boring bore portion disposed at the bottom permitting said higher top surface portion to insert in its narrower boring bore portion;
   a wedge ring having a center hole piercing therethrough at the center, a plurality of hook portions at the top around said center hole, a wider circular top edge, a narrower circular bottom edge inserted in said wider boring bore portion of said seal ring, and a tapered side wall, said tapered side wall having a circular arc surface at the outer side;
   a cone having a threaded hole at the center for mounting said threaded bolt of said tie plate, a loop at the top for holding of the hand, and a circular groove on its outer wall at a lower end within which said hook portions of said wedge ring are engaged; and
   wherein said cone can be rotated on said threaded bolt in forward direction to force said wedge ring against said stepped base of said tie plate so as to squeeze said seal ring to extend outward for sealing a tubing, or rotated on said threaded bolt in reverse direction to release squeezing force from said seal ring permitting said seal ring to return to its original condition.

* * * * *